UNITED STATES PATENT OFFICE.

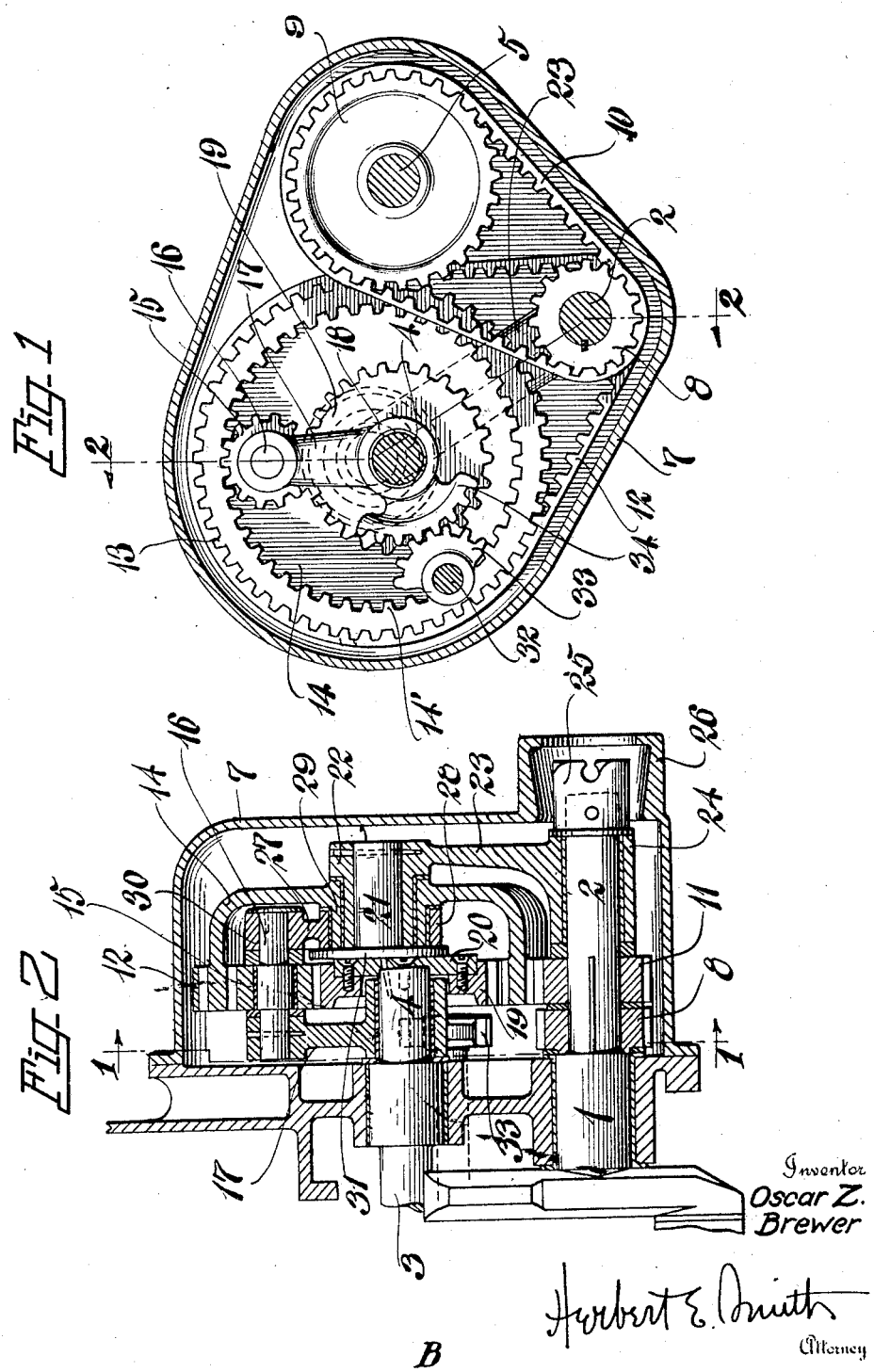

OSCAR Z. BREWER, OF SPOKANE, WASHINGTON.

TIMING MECHANISM.

1,358,186. Specification of Letters Patent. Patented Nov. 9, 1920.

Application filed December 4, 1919. Serial No. 342,483.

*To all whom it may concern:*

Be it known that I, OSCAR Z. BREWER, a citizen of the United States, residing at Spokane, in the county of Spokane and State of Washington, have invented certain new and useful Improvements in Timing Mechanisms, of which the following is a specification.

The present invention relates to an improved timing mechanism for valve operating mechanism of internal combustion engines, particularly of the four cycle type, by means of which the action of the intake valve and the exhaust valve are altered in their relationship by advancing or retarding the movement of the latter valve with respect to the former. The alteration or change in the timing is accomplished through gearing which coöperates or coacts with the mechanism which includes the crank shaft, the cam shaft of the intake valve operating mechanism and the cam shaft of the exhaust valve operating mechanism, the action however being restricted to a change of the exhaust valve shaft which revolves synchronously with the crank or driving shaft of the engine. The change in timing involves a change in the peripheral movement of the crank shaft and exhaust valve shaft to retard or advance the movement of the exhaust valve whereby, during the suspension of operation of the ignition system of the engine which eliminates an explosive stroke from the cycle, compression of the charge, or medium admitted through the intake or supply valve, is accomplished during the second and fourth strokes of the piston in the cylinder with the result that a braking action is produced to retard the speed of a vehicle that may be propelled from the motor or engine.

The change in the peripheral movement of the crank shaft and exhaust to alter the timing of the valves, is accomplished by manually operated connections from the steering column of an automobile or motor truck, as set forth in a contemporary application for patent of mine, Serial Number 342,482, filed December 4th, 1919, and which involves the broad principles of the subject matter of the present invention.

In the accompanying drawings I have illustrated one complete example of the physical embodiment of my invention, the parts being combined and arranged according to the chain or sprocket drive gear utilized to actuate the two valve operating shafts from the driving or crank shaft of the engine.

Figure 1 is a sectional view at line 1—1 of Fig. 2 showing the gear case in section and disclosing the chain gearing and connections of the invention.

Fig. 2 is a transverse sectional view on line 2—2 of Fig. 1 indicating the relationship of the crank shaft and connections with the exhaust valve operating shaft and gearing forming the subject matter of the invention.

In the exemplification of the invention I have indicated the crank shaft or driving shaft of the internal combustion engine as 1 which, for purposes of this invention, is provided with an extension or reduced journal end 2, while the exhaust valve operating shaft 3 also has an extension or reduced journal end 4. The shaft 5 is the cam shaft of the intake or supply valve operating mechanism, and the three shafts designated as 2, 3, and 5 are journaled as usual in the casing 6 of the motor or engine.

A gear casing 7 is attached to the engine or crank casing of the engine to inclose the operating gearing forming the subject matter of the invention, together with the gearing connecting these three shafts, one of the sprocket connections being provided from the crank shaft 1 through its fixed sprocket wheel 8 to the sprocket wheel 9, fixed on the intake or fuel supply valve operating shaft 5, by means of the sprocket chain 10, and by this connection the intake valve operating shaft is actuated synchronously with the crank shaft the ratio between the crank shaft and valve shaft being one to two revolutions.

The extension 2 of the crank shaft 1 carries a second sprocket gear wheel 11 keyed thereon (see Fig. 2) and provided with a sprocket chain 12, passing over the exterior teeth 13 of a double gear wheel 14, whose interior teeth 14′ are in continuous engagement with a small pinion 15 loosely journaled on a stud shaft 16 fixed in the free end of a loose arm 17 having its hub 18 loosely journaled on the extension 4 of the exhaust cam shaft 3.

The loose gear or idle pinion 15 is located between the interior gear 14′ and a larger gear wheel 19, concentric with the exhaust valve shaft 3, and attached at the end of its extension 4 by means of the plate or center disk 20, this arrangement providing a compact construction with the gear 19 rigid with the valve shaft and permitting the location of the hub 18 of the arm 17 on the extension 4.

Arranged eccentrically of the cam shaft 3, within the gear casing 7 is a pin or stud shaft 21 forming the axis of rotation of the double gear wheel 14, and this pin is fixed in the hub 22 of the arm 23 having its lower hub 24 loosely fitted over the extension 2 of the crank or driving shaft 1, a cap or head 25 being secured on the extremity of the extension bearing 2 to retain the hub of the arm 23 in place, and a hollow boss 26 being fashioned integrally of the gear case 7 to inclose the cap.

Concentric with the stud shaft 21 and loose with relation thereto is a link 27 having its enlarged hub 28 loose on the hub 29 of the double gear wheel 14, and it will be noted that the hub 29 in turn is loose on the hub 22 of the arm 23. At its free end the link has a smaller sleeve or journal bearing 30 on the pin 16 fixed in the cam shaft arm 17 of the exhaust valve operating mechanism, which arm is loose on the extension 4 of the shaft 3. In Fig. 1 this link is directly back of the arm 17 and therefore invisible in that view of the mechanism, but it will be apparent that the arm 23, link 27 and arm 17 are flexibly connected together through the double gear wheel 14 and the pinion 15 in order that the exhaust shaft 3 through its fixed gear 19 and pinion 15 may be advanced or retarded as to its peripheral rotation with relation to the crank shaft 1. The pin 21 has a head 31 which retains the hubs 28 and 29 on the hub 22, as seen in Fig. 2.

The change in the relationship of the exhaust valve shaft to that of the crank shaft is accomplished through the medium of a rock shaft 32 and its segmental rack 33 which latter is in mesh with the similar segment 34 integral with the hub 18 of the arm 17, the rack 34 and arm 17 thus becoming a two-arm lever operable to either the right or left in Fig. 1 through movement applied to the shaft 32 and its rack gear 33. This shaft 32 may be oscillated or rocked, as before stated, by connections from the steering column of a motor vehicle exemplified in the above mentioned application for patent.

What I claim is—

1. The combination with the crank shaft and its sprocket wheel and an arm loosely supported on the shaft, of a double gear wheel journaled in the arm and connected to the sprocket wheel, the valve shaft and a fixed gear thereon, an arm loosely journaled on the valve shaft and a pinion on the arm engaging the double gear wheel and fixed gear, and linked connection between the two arms.

2. The combination with the crank shaft having a sprocket wheel, a loose arm on the shaft and an interiorly toothed wheel having exterior sprocket teeth journaled in said arm and a sprocket chain, a valve shaft and a loose arm thereon and an idler gear wheel carried by the arm engaging the toothed wheel, and a connecting link between the two arms.

3. The combination with the crank shaft and loose arm thereon and interiorly toothed wheel journaled in the arm, and operative connection between the shaft and toothed wheel, of the valve shaft having a lever arm loose thereon and a segmental rack integral with the lever arm, a complementary segmental rack and actuating means therefor, an idler pinion carried by the lever arm engaging the toothed wheel, a fixed gear wheel on the valve shaft engaged by said idler, and a coupling link between said two arms.

4. The combination with the driving shaft and driven shaft, a lever arm on the driven shaft, and a loose arm on the driving shaft, of a gear wheel journaled on the loose arm and actuated from the driving shaft and fashioned with a hub, a link journaled on the hub, a pin fixed in the lever arm, an idler journaled on the pin engaging the gear wheel and said link loosely connected to the pin, a gear wheel fixed on the driven shaft in engagement with the idler, and lever mechanism for actuating the lever arm as described.

5. The combination with the driving shaft and driven shaft, a lever arm on the driven shaft and fashioned with a segmental gear and a complementary actuating-gear therefor, a loose arm on the driving shaft and an interiorly toothed gear wheel journaled on the arm, a sprocket wheel on the driving shaft, a sprocket formed on the toothed gear and a sprocket chain, a link journaled on the toothed gear wheel, a pin fixed in the lever arm and an idler journaled on the pin in engagement with the toothed gear wheel, said link having a loose connection with said pin, and a fixed gear wheel on the driven shaft engaging said idler.

In testimony whereof I affix my signature.

OSCAR Z. BREWER.